May 26, 1925.

Re. 16,081

F. A. CONNOLLY

SNOW MELTER AND PLOW

Original Filed July 12, 1924

INVENTOR

Frank A. Connolly

BY

ATTORNEY

Reissued May 26, 1925. Re. 16,081

UNITED STATES PATENT OFFICE.

FRANK A. CONNOLLY, OF POMPTON LAKES, NEW JERSEY.

SNOW MELTER AND PLOW.

Original No. 1,526,903, dated February 17, 1925, Serial No. 725,591, filed July 12, 1924. Application for reissue filed April 8, 1925. Serial No. 21,723.

*To all whom it may concern:*

Be it known that I, FRANK A. CONNOLLY, a citizen of the United States, and a resident of Pompton Lakes, in the county of Passaic and State of New Jersey, have invented a new and useful Snow Melter and Plow, of which the following is a full, clear, and exact description.

My invention relates to snow plows of a type in which a fire box is associated with the plow in such a way as to heat the plow head and melt most if not all of the snow it encounters while the unmelted snow, if there be any, is pushed to one side.

Another object of my invention is to provide a construction which may be used in connection with a propelling vehicle for removing snow from streets or roads and which construction can also be made in a smaller size to be propelled by hand for clearing sidewalks and paths.

A further object of my invention is to provide a special form of fire box fitted with a heat generating device in which the snow which is not immediately melted by contact with the face of the plow head, is brought directly into contact with the heat generator or with highly heated air or gas from the generator, and the melted snow is then carried off in channels through one side of the fire box.

Still another object is to provide a self contained snow plow and melter in which the fuel for the burners is carried in a reservoir supported by the frame of the plow.

With these and other objects in view, my invention consists in certain novel features of construction and combinations and arrangements of parts as will be more fully hereinafter described and defined in the claims.

Figure 1:
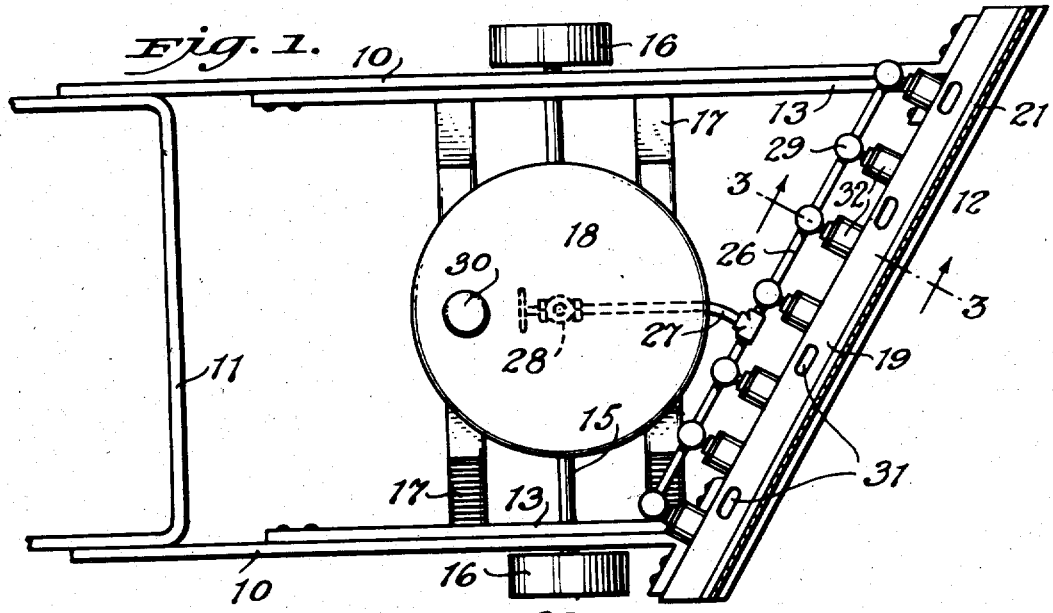
Figure 1 is a plan view of my snow plow and melter.
Figure 2:
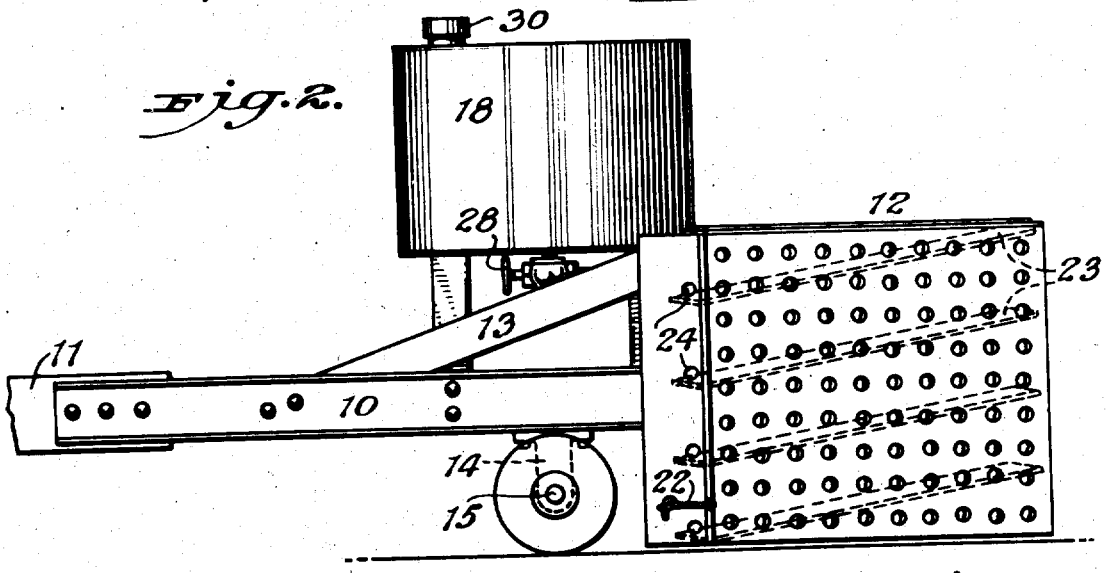
Fig. 2 is a side elevation of same.

Referring now to Figs. 1 and 2, the numeral 10 is used to designate a pair of side frame members which may be attached at the rear end to any suitable propelling vehicle, a portion of which is indicated at 11. At their forward end the members 10 are secured to the plow head 12. The latter, as best indicated in Fig. 1, is set up at such an angle with the axis of the vehicle, that when the plow is pushed forward against the snow, such of the snow as is not melted, will be forced to one side out of the path of the vehicle. In order to take the thrust of the snow against the plow, braces 13 are provided leading from the top of the plow head to the frame members 10. Depending from the lower edge of the frame members 10, are the bearing blocks 14, which support a shaft 15 on which are mounted the wheels 16. These wheels are adapted to run on the road or street and support the plow head so that it just clears the road way. A pair of brackets 17 are carried by the frame members 10 and support a tank 18 in which is stored the fuel for the burners.

Figure 3:
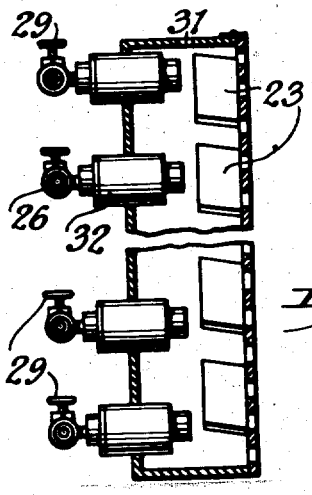
Fig. 3 is a section through the plow head taken on the line 3—3 of Fig. 1.

The plow head 12 is in the form of a receptacle or box 19 closed on the forward side by a perforated plate 20. This plate is hinged to the box by means of hinges 21 at the top of the box and is normally secured in closed position by means of hasps 22 near the lower end of the box. The inner face of the plate 20 is formed with flanges 23 which are inclined, as indicated by dotted lines in Fig. 2, running downward from the leading side of the plow head toward the after side of the plow head. These flanges, as shown in the sectional view of Fig. 3, are tilted upward rearwardly to form shallow channels. Any snow that is melted within the fire box flows down these channels to openings 24 in the after side of the box. The rear wall of the box 19 is formed with openings through which are projected a series of burners 25 adapted to heat the plate 20. These are distributed throughout the rear face of the box and receive a supply of fuel through pipes 26 connected to pipe 27 which leads to the bottom of the tank 18. A valve 28 controls the flow of fuel to the pipe 27. Each burner is also provided with a valve 29 to control the amount of fuel fed to it. The tank 18 is provided with a filling port in its upper face which is closed by means of a cap 30.

In operation the plow is propelled by any suitable vehicle, forcing the plow head into the snow so that the snow piles up against the hot plate 20. Plate 20 is heated by the burners 25 and most of the snow that contacts with the hot plate is melted. Some of the snow, however, will be forced through the perforations of the plate 20 and will be melted by contact with the hot gases from the burners 25. The perforations in the hot plate 20 will prevent such a large accumulation of snow within the fire box as to block the burners and extinguish them. The snow passing through the perforated plate 20 must enter the fire box in the form of filaments or shreds which expose a large surface to the heated gases and the filaments of snow are melted as fast as they enter. The resultant water then flows down the channels formed by the flanges 23 and pours out of the openings 24 at the after side of the plow head.

If snow is melted so rapidly as not to enter the perforations in solid form it will pass through them in liquid form and flow off through the channels formed by flanges 23; thus a means is provided for carrying off the water from melted snow through the hot plate preventing the accumulation of a thick film of water between the hot plate and the unmelted snow, which film would act as a heat insulator.

In order to provide for ventilation, ports 31 are provided in the top of the fire box. Air is supplied through the jackets 32 and the products of combustion pass out through the openings 31. When it is desired to adjust the burners or clean them, the plate 20 may be swung upward on its hinges.

The pressure of the snow against the plate 20 may be considerable and hence the flanges 23 are employed to serve the double purpose of forming channels and stiffening the plate against buckling.

As explained above, such snow as is not melted by penetration into fire box or by contact with the heat plate 20 will be scraped to one side out of the way of the propelling vehicle. This result will occur only in case of a very heavy snow, as the snow melter is designed to melt all ordinary falls of snow. If the depth of snow is slight, the upper burners 25 may be cut off by turning valves 29 so that only the lower portion of the fire box is heated.

While my snow plow and melter has been shown in Figs. 1 and 2 as attached to the frame of the vehicle, it will be readily apparent that the device may be made on a smaller scale for use on paths and sidewalks; the frame members 10 will then serve as handles by which the device can be propelled by hand.

Figure 4:
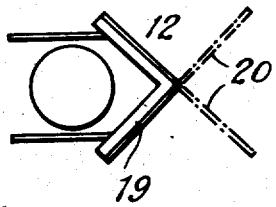
Figs. 4 and 5 are partly diagrammatic views showing in plan view two modifications of my snow plow and melter.
Figure 5:
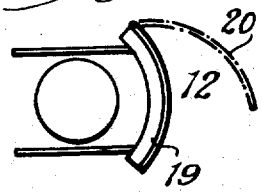

I do not wish to limit myself to the precise details of construction shown in Figs. 1 to 3. It will be evident that material changes can be made from this construction without departing from the spirit and scope of my invention. For example I have shown two modifications of my invention in Figs. 4 and 5. In Fig. 4, a double plow head is used, the two parts of the head being inclined one to the other to form a V-shaped plow. While in Fig. 5 the plow is of arcuate form as viewed from above. In Fig. 4 two perforated plates 20 are used which are hinged on vertical hinges at the point of the plow so that access to the fire box may be had by swinging the plates to the positions shown by broken lines. In Fig. 5, a single arcuate plate 20 is used which is hinged to the fire box at one edge thereof on vertical hinges. The broken line shows the plate swung to an open position.

Under certain conditions it will not be necessary to use the heating element in connection with my plow, as for instance, when the snow is light and flaky, under such conditions the snow will enter the plow head through the perforated plates, being compressed therein, and will be discharged through the lateral openings in the box, being laid at the side of the road in a ridge of reduced volume or, if a V-shaped or an arcuate plow head is used, in two ridges bordering the path of the plow. I therefore do not wish to limit myself to the combination of a heating element with my perforated plow head but contemplate using my improved plow without heat under certain conditions.

In some forms of plow heads, it may not be necessary to use the supporting wheels 16 and I do not wish to limit myself to the use of such wheels. The plow head could rest on the ground and be scraped along the road surface. The fuel tank could be supported on the propelling vehicle rather than on the frame of the plow, but there are distinct advantages in imposing the weight of the tank and fuel on the plow in order to keep the plow from riding upward on the snow instead of plowing into it. It will also be evident that the plow head, instead of standing vertically as shown in Fig. 2, could be inclined with its lower edge leading the upper edge so that snow would pile up on the plate 23 and expose a larger surface to the heat of the burners.

These and other slight modifications of construction are included within the scope of my invention and I do not wish to limit myself to the precise construction shown in the drawings.

I claim:

1. A machine for plowing snow comprising a plow head adapted to be propelled into the snow, the plow head being formed with a chamber therein and with an opening to permit snow to enter the chamber and with an opening to permit the discharge of snow from the chamber.

2. In a machine of the character described, a plow head comprising a receptacle and a plate forming the front wall of the receptacle, said plate being formed with ports for the admission of snow into the receptacle, said receptacle being formed with lateral ports for the discharge of snow.

3. In a machine of the character described, a plow head comprising a chamber formed with lateral discharge ports, a plate constituting the front wall of the chamber and formed with ports for the admission of snow into the chamber, and means in the chamber for guiding the snow therein to said discharge ports.

4. A machine for plowing and melting snow comprising a plow head adapted to be propelled into the snow, the plow head being formed with a fire box therein and being further formed with openings to permit a portion of the snow to enter the fire box, and means for discharging said portion after it has been melted.

5. In a machine of the character described, a plow head comprising a fire box having heat generating means therein, and a plate forming the front wall of the plow head, the plate being formed with ports for the admission of snow to the heat generating means.

6. In a machine of the character described, a plow head comprising a fire box and having a perforated plate forming the front wall of the fire box, heat generating means in the fire box, the fire box being formed with discharge openings, and flanges on the rear face of the perforated plate forming channels leading to said openings.

7. In a machine of the character described, a plow head comprising a fire box, a perforated plate hinged on the fire box and forming the front wall thereof, flanges carried by the perforated plate to reinforce the same against buckling, the flanges being inclined and formed to serve as channels, and means for holding the plate in closed position.

8. In a machine of the character described, a plow head comprising a fire box having a perforated front wall, burners fitted into the fire box, the fire box being formed with ventilation openings and with discharge openings, and a fuel reservoir adapted to feed fuel to the burners.

9. In a machine of the character described, a plow head comprising a fire box having a perforated front wall, burners fitted into the fire box, the fire box being formed with ventilation openings and with discharge openings, a fuel reservoir adapted to feed fuel to the burners, and means for cutting off the supply of fuel to the burners individually.

10. In a machine of the character described, a plow head comprising a fire box having a perforated front wall, burners fitted into the fire box, the fire box being formed with ventilation openings and with discharge openings, a fuel reservoir adapted to feed fuel to the burners, and a valve on each burner adapted to cut off the supply of fuel thereto.

11. A method of melting snow which consists in shredding the snow and exposing the shreds to the hot gases of a burner.

12. A method of melting snow which consists in shredding the snow, exposing the shreds to a burner, and conveying the melted product from the burner.

13. A method of melting snow by direct contact with the flame of a burner which consists in passing the snow through a perforated plate whereby the snow is formed into shreds, and exposing the shreds to the flame of the burner.

14. A method of melting snow in which a fire box fitted with burners and having a perforated face plate is forced into the snow causing a part of the snow to enter the fire box in the form of shreds thereby exposing to the burners a large surface area relative to the mass of snow, and discharging the melted snow from the fire box.

FRANK A. CONNOLLY.